United States Patent [19]

Shih

[11] Patent Number: 5,641,442
[45] Date of Patent: Jun. 24, 1997

[54] AIR- AND WATER-PERMEABLE RUBBER AND METHOD FOR PRODUCING SAME

[75] Inventor: Ruey-Sheng Shih, Hsinchu, Taiwan

[73] Assignee: Industrial Technology Research Institute, Hsinchu, Taiwan

[21] Appl. No.: 193,706

[22] Filed: Feb. 9, 1994

[51] Int. Cl.$^6$ .......................... B29C 43/00; B01D 67/00
[52] U.S. Cl. .................. 264/115; 264/126; 264/331.13; 521/140; 521/919
[58] Field of Search ..................... 521/140, 919; 264/552, 236, 294, 331.13, DIG. 62, DIG. 63, 126, 319, DIG. 69, 118, 115; 525/192, 194

[56] References Cited

U.S. PATENT DOCUMENTS 4,340,684  7/1982  Bohm et al. ....................... 525/194

FOREIGN PATENT DOCUMENTS 754707  8/1956  United Kingdom ............... 521/919

*Primary Examiner*—Paul R. Michl
*Assistant Examiner*—Mark L. Warzel
*Attorney, Agent, or Firm*—Darby & Darby, P.C.

[57]  ABSTRACT

An air-permeable and water-permeable rubber includes by weight 100 parts of a rubber, about 30 to 80 parts of a plastic, about 1 to 5 parts of a cross-linking agent, about 1 to 10 parts of a vulcanizing agent, about 1 to 10 parts of a rubber accelerator, 0 to about 100 parts of a filler, and 0 to about 10 parts of an anti-aging agent. Such air-permeable and water-permeable rubber has excellent air-permeability, water-permeability, softness, and elasticity. The present invention also includes a method for producing the above rubber.

11 Claims, 1 Drawing Sheet

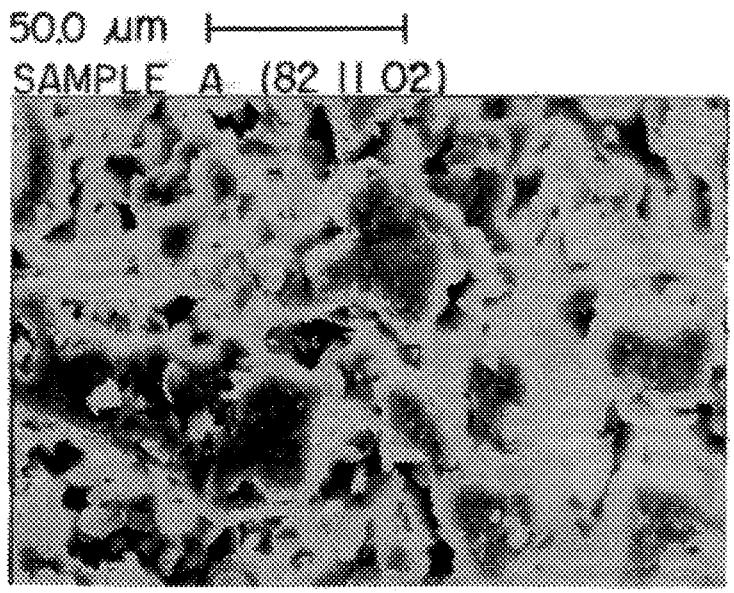

AIR- AND WATER-PERMEABLE RUBBER AND METHOD FOR PRODUCING SAME

BACKGROUND OF THE INVENTION

The present invention relates generally to an air-permeable and water-permeable rubber and a method for producing the same.

One conventional technique for producing the air-permeable and water-permeable rubber having a porous structure includes steps of:

(a) adding a large amount of an inorganic salt, such as NaCl, into a raw rubber material;

(b) shaping the rubber material containing the inorganic salt in a mold to form an intermediate product; and (c) dissolving the inorganic salt in the intermediate product in water to obtain the final product. Unfortunately, this technique is troublesome and time consuming and therefore is not practical.

Another conventional technique for producing the air-permeable and water-permeable rubber having a porous structure includes steps of: grinding a waste rubber into powder or particles and mixing the powder or particles with an adhesive to bind the powder or the particles to form a porous structure. In this technique, the powder or particles only serve as a filler, and therefore the final product has different pore sizes, it is not uniform and fine, and its elasticity and softness do not meet the required specifications. It is therefore desirable to form a water- and air-permeable rubber which does not have the deficiencies of the prior art.

SUMMARY OF THE INVENTION

The primary object of the present invention is to provide a new and improved porous rubber structure which is air-permeable and water-permeable and has excellent softness and elasticity. Another object of the present invention is to provide a method for quickly and easily producing a porous rubber structure which is air-permeable and water-permeable.

(a) Because the present rubber is a porous vulcanized rubber obtained by combining a semi-vulcanized powder with an unvulcanized plastic powder, the strength thereof is excellent because of the high degree of compatibility of the powders.

(b) Because the final product is formed from the semi-vulcanized powder, the distribution of the pores in the final product is uniform and the pores are open, i.e., intercommunicable (as shown in the Figure). Thus, the final product possesses excellent permeability.

(c) The density of the final product can be adjusted as desired and controlled by the mold compressibility and the thickness washer.

BRIEF DESCRIPTION OF THE DRAWING

The FIGURE is an SEM photograph which shows a microstructure of an air-permeable and water-permeable rubber according to the present invention.

DETAILED DESCRIPTION OF THE INVENTION

In accordance with one aspect of the present invention, the rubber, which may have a porous structure, is prepared by forming a composition comprising:

TABLE 1

| Components | Parts by Weight |
|---|---|
| Rubber | 100 |
| Plastic | about 30 to 80 |
| Cross-linking Agent | about 1 to 5 |
| Vulcanizing Agent | about 1 to 10 |
| Rubber Accelerator | about 1 to 10 |
| Filler | 0 to about 100 |
| Anti-aging agent (e.g., an antioxidant) | 0 to about 10 |

The rubber can be natural rubber (NR), chlorinated rubber (CR), styrene-butadiene rubber (SBR), or butyl rubber (IIR). The plastic can be a polymer or copolymer of the ethylene series, e.g., polyethylene (PE) or ethylene-vinyl acetate copolymer (EVA).

The cross-linking agent can be dicumyl peroxide (DCP).

The vulcanizing agent can be sulfur (S).

The rubber accelerator can be zinc oxide (ZnO), zinc stearate (ZnSt), and/or tetramethylthiuram disulfide (TMTD).

The filler can be calcium carbonate ($CaCO_3$), carbon black, or titanium dioxide ($TiO_2$).

The anti-aging agent can be an antioxidant.

In accordance with another aspect of the present invention, the air-permeable and water-permeable rubber is prepared by the following series of steps: a) mixing uniformly a rubber having the composition set forth in Table 1 above; b) heating the mixture under pressure, preferably in a mold, to initiate a semi-vulcanization reaction therefor to obtain a semi-cured product; c) cooling and grinding the semi-cured product to obtain a powder, and d) heating the powder under pressure in a compression mold to form a final vulcanized product having a porous structure.

In step a) above, the mixture can be heated at a temperature of from about 150° C. to 180° C. at a mold pressure of from about 70 $kg/cm^2$ to 150 $kg/cm^2$. The mixture is then ground to a powder having a particle size of from about 100 μm to 200 μm. The powder is heated in the mold in step d) to a temperature of from about 160° C. to 180° C. at a pressure of from about 70 $kg/cm^2$ to 150 $kg/cm^2$. The mold can have a mold compressibility of from about 40% to 60%.

The semi-vulcanization reaction time is chosen according to the specific formulation used and is normally set to be about one-half the most preferred vulcanization reaction time. After the vulcanization reaction is completed, the final product can be directly removed from the mold without being cooled.

The present invention can be more fully understood by reference to the following description and the accompanying drawing.

EXAMPLE

The formulation of a preferred embodiment of the present invention, shown in Table 2, is initially uniformly mixed.

TABLE 2

| Formulation | Amount (parts) |
|---|---|
| EVA | 40 |
| SBR | 100 |
| ZnO | 1 |

TABLE 2-continued

| Formulation | Amount (parts) |
|---|---|
| ZnSt | 0.5 |
| S | 1.0 |
| TMTD | 0.4 |
| DCP | 0.4 |

The mixture is then semi-vulcanized in a hot press at a mold temperature of 160° C. and a mold pressure of 120 kg/cm$^2$ for 8 minutes to form the semi-cured product. The semi-cured product is then ground in a grinder into a powder having a particle size of from about 100 μm to about 200 μm. Finally, the powder is molded in a hot press at a mold temperature of about 170° C., a mold pressure of about 100 kg/cm$^2$, and at a mold compression of about 40% to 60% until the product is vulcanized completely.

A comparison of the properties of the present rubber and a conventional porous air-permeable insole is shown in Table 3.

TABLE 3

| PROPERTIES | THE PRESENT INVENTION | CONVENTIONAL POROUS AIR-PERMEABLE INSOLE |
|---|---|---|
| TENSILE STRENGTH (kgf/cm$^2$) | 22.0 | 10 |
| ELONGATION (%) | 350 | 250 |
| TEAR STRENGTH (kgf/cm) | 5.5 | 4.0 |
| DENSITY (g/cm$^3$) | 0.5 | 0.3 |
| HARDNESS (Type C) | 20 | 18–30 |
| POROSITY | inter-communicable | partly inter-communicable |
| SIZE OF PORE | 40–60 μm (fine) | 0.5–1 mm (coarse) |

To sum up, the rubber obtained by the method of the invention has excellent physical properties as compared to the porous air-permeable products of the prior art.

While the present invention has been described in connection with what is presently considered to be the most practical and preferred embodiment, it is to be understood that the invention is not to be limited to the disclosed embodiment. On the contrary, it is intended to cover various modifications and equivalent arrangements included within the spirit and scope of the appended claims, which scope is to be accorded the broadest interpretation so as to encompass all such modifications and equivalent structures.

What is claimed is:

1. A method for making an air-permeable and water-permeable rubber including the steps of:

a) mixing uniformly 100 parts of a rubber, about 30 to 80 parts of a polymer of ethylene or ethylene-vinyl acetate, about 1 to 5 parts of a cross-linking agent, about 1 to 10 parts of a vulcanizing agent, about 1 to 10 parts of a rubber accelerator, 0 to about 100 parts of a filler, and 0 to about 10 parts of an anti-aging agent to form a mixture;

b) heating, under pressure said mixture to semi-vulcanize the rubber to obtain a semi-cured product;

c) grinding said semi-cured product to form a powder; and d) heating said powder, under pressure, in a mold to completely vulcanize the rubber and crosslink the polymer to form the final product.

2. The method according to claim 1 wherein said powder has a particle size of about 100 μm to 200 μm.

3. The method according to claim 1 wherein said powder is heated to a temperature from about 160° C. to 180° C.

4. The method according to claim 1 wherein said powder is maintained under a pressure of from about 70 g/cm$^2$ to 50 kg/cm$^2$.

5. The method according to claim 1 wherein said mold has a mold compressibility about 40% to 60%.

6. The method of claim 1 wherein said rubber is natural rubber, chlorinated rubber, styrene-butadiene rubber, or butyl rubber.

7. The method of claim 1 wherein said crosslinking agent is dicumyl peroxide.

8. The method of claim 1 wherein said vulcanizing agent is sulfur.

9. The method of claim 1 wherein said rubber accelerator is zinc oxide, zinc stearate, tetramethylthiuram disulfide, or a combination thereof.

10. The method of claim 1 wherein said filler is calcium carbonate, carbon black, or titanium dioxide.

11. The method of claim 1 wherein said anti-aging agent is an antioxidant.

* * * * *